R. T. PEIRCE.
REINFORCED CONCRETE CONSTRUCTION.
APPLICATION FILED MAR. 12, 1910.
1,060,853.
Patented May 6, 1913.
3 SHEETS—SHEET 1.
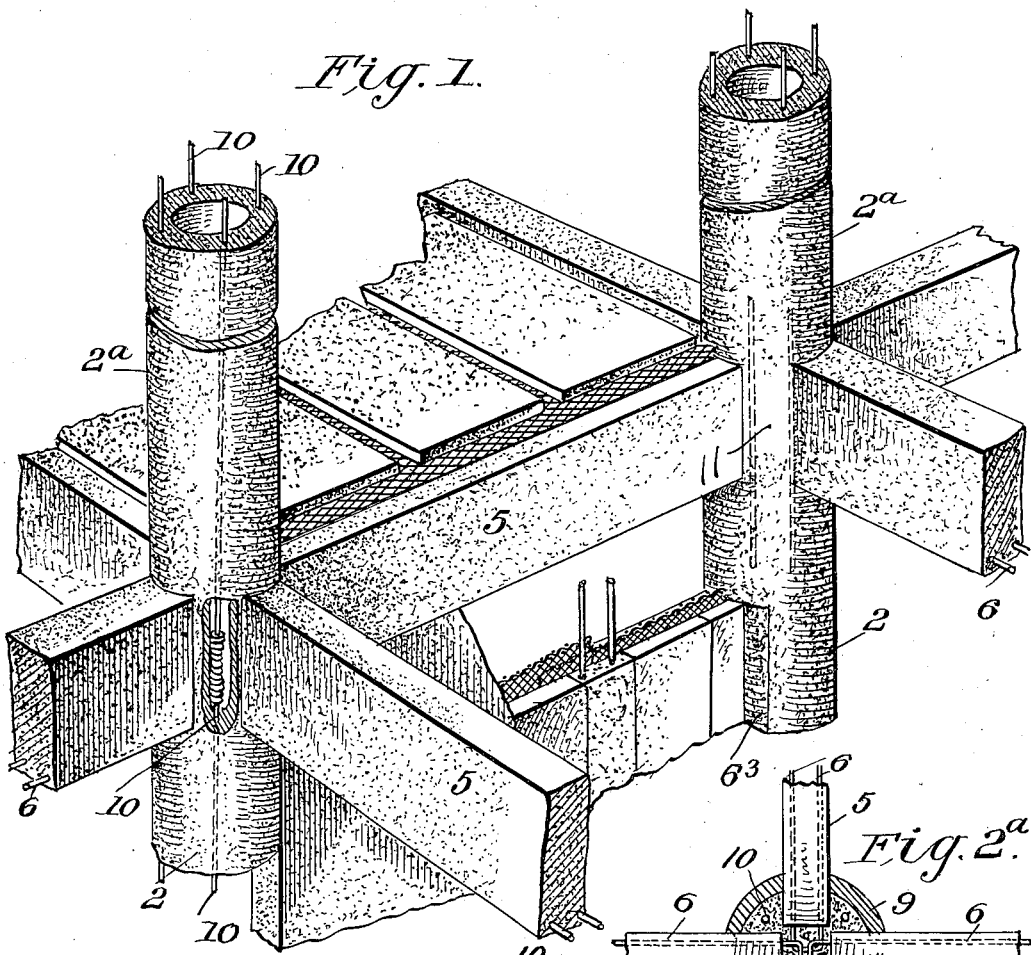
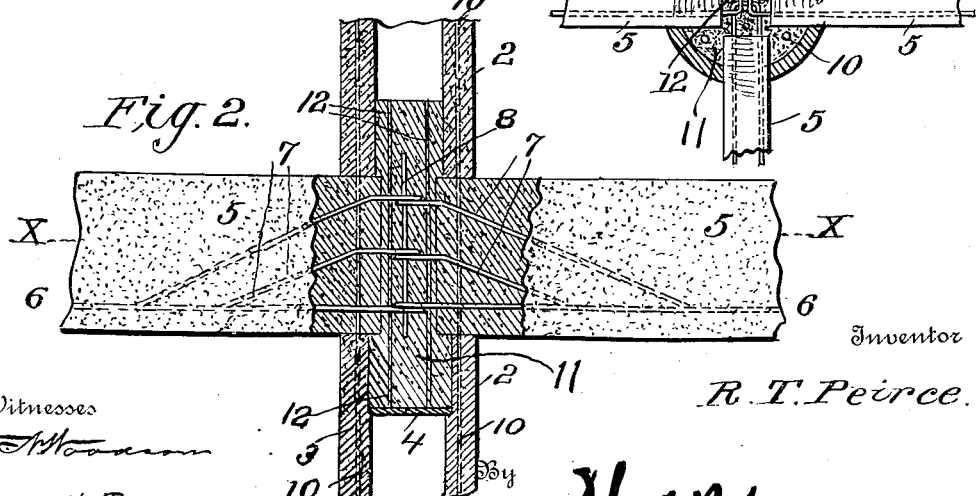

R. T. PEIRCE.
REINFORCED CONCRETE CONSTRUCTION.
APPLICATION FILED MAR. 12, 1910.
1,060,853.
Patented May 6, 1913.
3 SHEETS—SHEET 2.
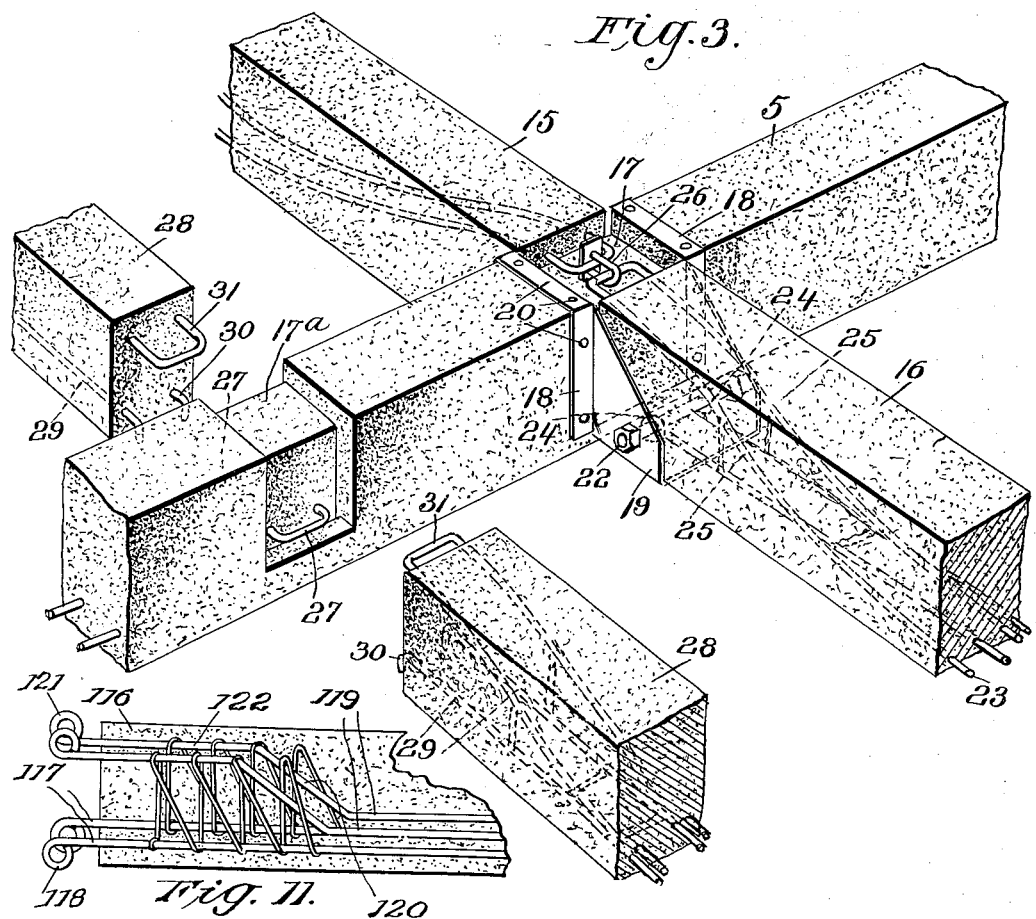
Witnesses
Inventor
R. T. Peirce
By
Attorneys

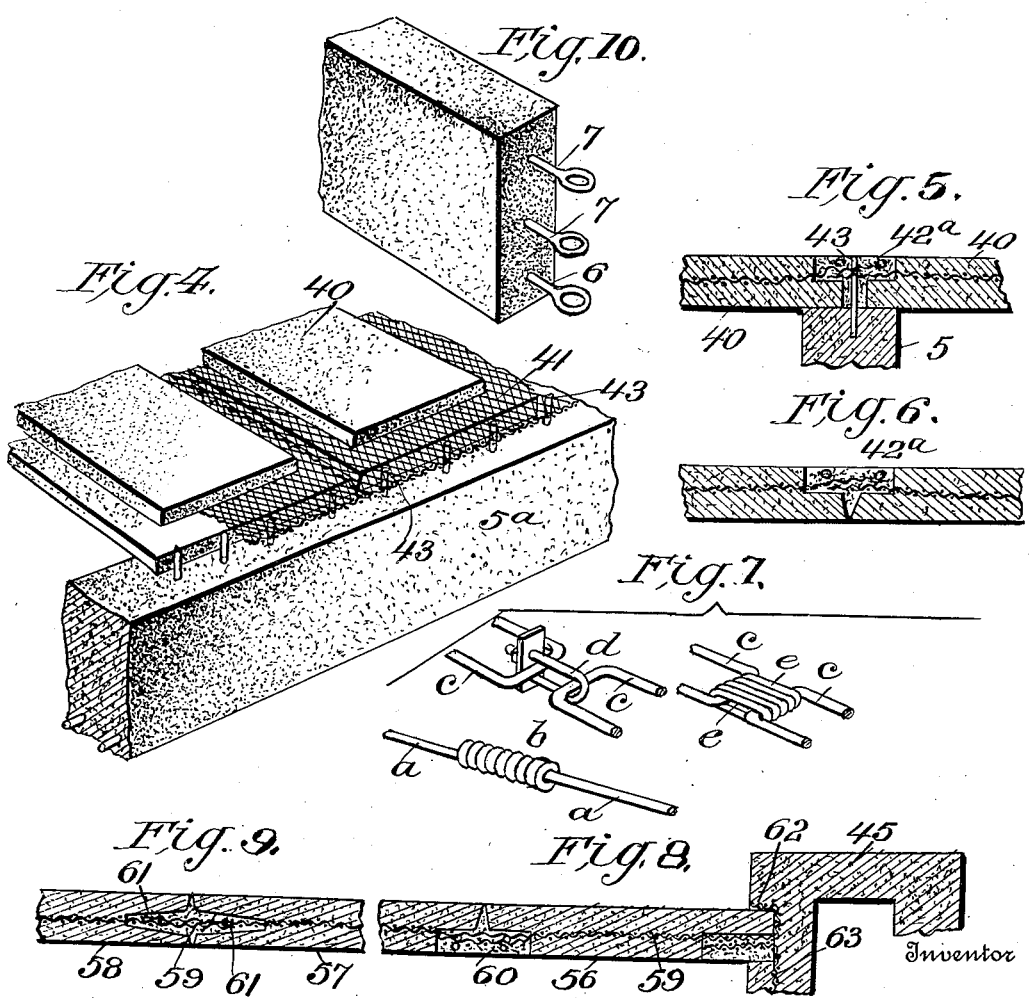

UNITED STATES PATENT OFFICE.

ROBERT T. PEIRCE, OF NEWPORT NEWS, VIRGINIA.

REINFORCED CONCRETE CONSTRUCTION.

1,060,853.  Specification of Letters Patent.  Patented May 6, 1913.

Application filed March 12, 1910. Serial No. 548,978.

*To all whom it may concern:*

Be it known that I, ROBERT T. PEIRCE, citizen of the United States, residing at Newport News, in the county of Warwick and State of Virginia, have invented certain new and useful Improvements in Reinforced Concrete Construction, of which the following is a specification.

My invention relates to a system of construction for the erection of structures formed of reinforced concrete, and it particularly relates to means whereby the various members of the construction may be bonded to each other so that the completed structure will be practically monolithic.

The present system of reinforced concrete construction as applied to buildings, bridges, viaducts and like work, consists in molding the constructional members in place as the work progresses. This is expensive, but it is done to secure a continuous bond between the several members and to also secure a continuous bond of the reinforcing bars or rods. It is only by molding the members in place that this result could be attained prior to my invention.

My improved system of concrete construction consists, generally speaking, in molding the individual parts (as columns, girders, etc.) separately in any place desired, and allowing them then to harden. The members are then erected in place and bonded together to form a practically monolithic structure by means of the peculiar bonding system which I have devised. In this way, the cost of the molds or forms and the staging for molding the concrete building is avoided and the cost of construction is very much reduced. Furthermore, construction members which have been separately molded and hardened can be inspected better than can concrete constructions which are formed in place, and therefore a better construction is assured, my improved system having equal efficiency of bond and reinforcing to that given by the "molded-in-place" method. Essential to my improved system is the use of hollow columns which are hollow either their whole length or for part of their length at top and bottom, and the combination with such hollow columns of beams or girders or like parts having projecting reinforcing rods or bars adapted to overlap when the beams are abutted, and which are tied or bonded to each other at the same time that the beams are bonded to the hollow columns. This is secured by bringing the girder ends over the hollow center of the column, and then filling in the center of the column and the space between the ends of the girders with fresh concrete, thus casting a continuous joint at the junction of the beams, the columns and the reinforcing bars.

My invention also contemplates the application of the same principles to concrete flooring and concrete partitions.

For a full understanding of the invention and the merits thereof, and to acquire a knowledge of the details of construction, reference is to be had to the following description and accompanying drawings, in which:

Figure 1 is a perspective view showing the manner of supporting horizontal members upon the vertical members of the structure: Fig. 2 is a vertical section through superposed columns, the beams supported thereon being partly in elevation and partly in section; Fig. 2ª is a section on the line $x$—$x$ of Fig. 2, but showing the mold in place, whereby the bond is made; Fig. 3 is a perspective view showing the two methods of attaching the subsidiary beams to the main beams. Fig. 4 is a sectional perspective view showing another means of attaching the floor slabs to the supporting beams; Fig. 5 is a fragmentary longitudinal section through two adjacent floor slabs and one of the supporting beams; Fig. 6 is a transverse section through two adjacent floor slabs and the supporting beam on the line $x$—$x$ of Fig. 7; Fig. 7 is a perspective view showing various forms of ties between the reinforcing bars: Fig. 8 is a horizontal section through the adjacent ends of two partition slabs and a column; Fig. 9 is a like view to Fig. 11, not showing the column, however, but showing the modified method of bonding the two adjacent partition slabs; and, Fig. 10 is a perspective view of the end of the beams, showing one form of tie rods. Fig. 11 illustrates a beam or girder such as may be used with my improved system showing particularly one manner of reinforcing the girder.

Corresponding and like parts are referred to in the following description and accompanying drawings by the same reference characters.

In Figs. 1 to 2 I show the means whereby transverse beams or like horizontal members are connected to the columns upon which they are supported. 2 designates the columns. These columns may be either tubular or hollow from one end to the other, or may be hollow for only a portion of their length, that is, at the ends thereof. The upper ends of the columns are preferably formed on their inside faces with an annular shoulder 3 upon which a plate 4 may be supported to form a support for the fresh concrete which is poured in to make the bond, as hereafter described. The concrete beams 5 are of any suitable or desired construction and are provided with the longitudinally extending reinforcing rods or bars 6 extending along their entire length and projecting beyond the ends of the beam. A plurality of these reinforcing rods or bars may be used if desired, located in any suitable portion of the beam, but ordinarily these reinforcing rods will be placed below the neutral axis of the beam, and the ends of the beam will be provided with a plurality of relatively short reinforcing rods 7 which will project out from the ends of the beam at different levels and extend down to the main reinforcing bar 6, as shown in Fig. 2. It will thus be seen that each beam has a plurality of reinforcing bars projecting out of the ends thereof, and it will also be seen from Fig. 2 that the reinforcing bars on one beam project out far enough to overlap the projecting rods on the next adjacent or abutting beam, when these beams are placed upon the upper end of one of the columns 2. These projecting and overlapping ends of the reinforcing bars are adapted to be connected to each other or tied together in any suitable manner. Any one of many ways of tying these reinforcing bars to each other might be used, and some of these will be described later. As shown in Fig. 11, however, the ends of the reinforcing bars 6 and 7 are formed with eyes through which a vertical tie rod 8 may be placed. After these beams 5 are in place with their ends projecting over the hollow interior of the column 2 and with their reinforcing bars tied together by the vertical tie rod 8 or in any other suitable manner, the interior of the column and space between the beams is filled with concrete or like plastic material which will harden, the concrete being poured in from the upper end and being supported upon the plate 4. The upper end of the interior of the column is thus filled to a level with the upper faces of the beams 5. In order to secure this result, a mold is used, or box 9 which incloses the ends of the beams and the upper portion of the column 2, as shown in Fig. 2$^a$. The columns 2 are each provided with a plurality of upwardly extending reinforcing rods 10, and as shown in Fig. 2$^a$, these reinforcing rods project up on each side of the beams 5. Thus, after the cement or concrete has been poured into the molds 9 and hardened, the joined ends of the beams and the upper end of the column 2 will be bonded together and will be a monolithic construction, the tie rods being tied to each other. The reinforcing bars, by reason of the tie between them, will be continuous from beam to beam. The filling 11 is also preferably provided with vertically extending reinforcing rods 12. Where columns are to be superposed upon the columns just erected, as for instance, the columns 2$^a$ upon the columns 2. The same operation is performed as that previous to the filling in of the bonding cement 11. The column 2$^a$ is placed in position resting upon the beams 5 and immediately above the column 2, its reinforcing bars or rods 10$^a$ extending downward on either side of the beams 5 and overlapping and tied to the reinforcing bars or rods 10. The mold 9 is then put in place and cement poured down through the hollow interior of the uppermost column 2$^a$ until the upper end of the column 2, the space between the beams 5 and the lower end of the column 2$^a$ is filled with cement, as illustrated. This construction, it will be seen, gives a continuous and practically monolithic bond to the beams 5, the column 2 and the column 2$^a$, and furthermore provides, as previously described, for an enlarged joint between the intersecting longitudinal beams and the transverse beams 5. The result of this construction is shown in Fig. 1, wherein the beams 5 are shown as supported upon the column 2 and in turn supporting a column 2$^a$. This figure shows the appearance of the exterior of the columns after the joint has been made. It will be obvious that the same principle may be applied to intersecting beams, as shown in Fig. 2$^a$ and as previously described.

I have also made provision for supporting intermediate transverse beams or girders upon the beams or girders 5. The joint used in this construction is shown in Fig. 3, wherein 15 and 16 designate two abutting transverse beams supported on a beam 5 much as previously described. The beam 5 is cut away or scarfed on its upper face as at 17, to form a recess for the reception of the fresh cement or concrete, this recess extending across the top face of the beam. On either side of this recess 17 is disposed a wrought iron beam hanger 18 of any usual construction, but preferably having the outwardly projecting flanges 19 forming shoes in which the extremities of the beams 15 and 16 are supported. This hanger is preferably bolted through the beam 5 by means of bolts 20, and the outwardly projecting flanges 19 are provided with openings for the passage of a bolt 22. The beams 15 and 16, shown in Fig. 3, are of concrete, separately formed and hardened, and have the longitudinally extending reinforcing bars 23 located below the neutral axis of the beam, the extremity of the bars 23 being formed into eyes 24, these rods 23 being shorter than the length of the beam, and the eyes 24 being therefore entirely within the beam. The beam is formed with a transverse passage which alines with the eyes 24 and which, when the beam is in place, alines with the openings in the flanges 19 so that the pin 22 may pass through the extremity of the beams 15 or 16 and will lock the beam to the hanger 18. Extending upward and outward from the reinforcing rods 23 are the reinforcing rods or bars 25 which are U-shaped and extend out of the end of the beam 15 or 16 above its neutral axis and in such position as to project over the upper face of the cut-away portion of the beam 5, as shown in Fig. 3. The projecting U-shaped ends of the opposed beams 15 and 16 are thus in alinement with each other and are adapted to be engaged by and drawn toward each other by means of a clip or connector 26. This clip may have any suitable form, but is shown as having the form of a U-shaped bolt. After the beams 15 and 16 are in place and connected to the beam hanger and to each other, the space between the beams 15 and 16 and the beam 5 and above the latter is to be filled in with cement, concrete or other suitable like material, thus bonding the beams 15 and 16 to the beam 5 and forming practically a monolithic construction in which the tie bars or reinforcing bars are tied to each other.

In Fig. 3 is also shown another manner of connecting these intermediate beams to the main beams 5. In this form of the invention the main beam 5 is cut out at 17, as previously described, but the sides of the cutout portions of the beams are provided with the outwardly extending U-shaped clips or eyes 27. The beams 28 which correspond with the beams 15 and 16 are provided with the longitudinally extending reinforcing rods 29 which project out beyond the ends of the beams and are downwardly turned to form hooks 30. These hooks are adapted to engage over the U-shaped clip 27. The upper portion of the end of the beams 28 is provided with the U-shaped projecting bar 31 which extends across the upper face of the recessed portion in exactly the same manner as just previously described, the beams 28 being connected to each other in the same manner as the beams 15 and 16, the space between the bars and around the beams 5 being filled in with fresh cement or concrete.

In Figs. 4 to 6 is shown the floor slab and the means whereby the floor slabs are attached to the floor beams so as to form a continuously bonded and practically monolithic construction. The slabs 40 have their lower portions projecting beyond the upper portions, and the reinforcing wire netting 41 which is disposed within the interior of the slab, projects out beyond the upper portion of the slab over the upper face of the lower portion of the slab and beyond the edge of the slab so that when side edges of adjacent slabs are abutted, as in Fig. 4, the reinforcing wire netting or expanded metal of one slab will overlap the wire netting, rods or expanded metal reinforcement of the other slab. The space between the two slabs is then filled with cement or concrete, as at 42. The end edges of the slabs are not abutted in contact with each other as are the side edges, but a space is left, and the floor beam which may be either beams 5, 15 or 35, but which is designated in Fig. 4 as 5ª, is provided with the upwardly projecting pins or rods 43 which extend upward between the ends of the slabs 41 and into engagement with the wire mesh of the reinforcement. It will thus be seen that the two slabs are locked together and also interlocked with the beam 5ª and that the space between the floor slabs is filled in with cement 42ª. Thus the floor slabs are provided with a practically continuous bond, and are bonded and interlocked with the floor beams and form practically a monolithic construction in entire harmony with the system by which the columns and beams are attached to each other.

The partition walls may also be constructed in practically the same manner as the floor slabs, in other words, slabs reinforced by wire netting, rods or expanded metal, the edges of the slabs being cut away to permit the reinforcing metal to extend beyond the slabs, said reinforcements being overlapped and the space between the slabs being filled with cement. Such construction is shown in Fig. 8, in which 45 designates one of the hollow columns of cement previously described, and 56, 57 and 58 three partition slabs. The slab 56 is cut away on its margin and is provided with the internal reinforcements which may be of wires, rods, or wire netting. These reinforcing members 59 extend through the slab and project out beyond the edge of the slab so that when the slabs 56 and 57 are abutted against each other, the projecting ends of the reinforcing members 59 will overlap. The space between the abutting edges of the slabs is then filled with cement 60. The slab 57 is shown at one side as having the V-shaped recess 61 formed in its edge, which coincides with a V-shaped recess 61 formed in the slab 58. The reinforcing member 59 extends out beyond the margin of the slab and into the recess in the adjacent slab when the slabs are abutted. The space between the two slabs may be filled with cement. Thus the slabs are connected to each other by the overlapping ends of the reinforcing members which may be tied to each other, if desired, and by the filling of cement or concrete. The partition wall may be tied to the column by forming the column with a vertically extending recess 62 in which the edge of the adjacent partition slab is received. This column is also provided with reinforcing members 63 embedded within it and extending out into the recess 62, and then bent at right angles so as to overlap the projecting ends or portions of the reinforcing member 59. The recessed margin of the slab 56 is then filled with cement which also fills the recess 63, thus bonding and tying the slab 56 to the column. This filling may also be reinforced by rods.

I do not wish to be limited to any particular form of reinforcing bonds, rods or wires, as in my system of concrete construction any form of reinforcing members may be used. These reinforcing members may be tied to each other in any desired manner, and I have shown in Fig. 7 a number of different forms of ties, any one of which may be used. Thus in one form, the two reinforcing bars $a$ are simply lapped upon each other and then wound with the tie wire $b$. In another form, the looped ends $c$ of the reinforcing bar are brought adjacent to each other and then drawn together by a clip $d$. In another form, these two looped ends $c$ of the bars are drawn together by a wrapping of tie wire $e$.

It will be seen that my construction, as before stated, provides a system of building concrete structures which secures advantages not incident heretofore to the similar use of independent elements molded and hardened and then applied to the building but without any integral monolithic tie and continuous bond, and not incident to that form of concrete construction in which the building and its various building elements are molded in place. I secure the advantages of both these constructions without their disadvantages, and when the building is completed, it forms practically a monolithic construction with continuous reinforcing tie bars or rods. It is to be noted also that the principles of my invention have been carried out throughout all the parts of the building, and that as far as principle goes, the floor slabs and partition slabs are tied to the beams and columns in precisely the same manner as the floor slabs and girders are tied to the columns supporting the same. The principle is the same in all cases, though the mode in which the principle is carried out differs of course according to circumstances.

While I have shown the columns of my construction as being cylindrical and tubular, I wish it distinctly understood that these columns may be square or polygonal in cross section, it being entirely consistent with the principles of my invention. Furthermore, I do not wish to be limited to any special form of reinforcing extending through these columns or through the concrete structures supported thereby and forming part of the building to which my system is applied. I may use therefore reinforcing in the form of rods, bars, corrugated rods, wires or netting. As far as the principle of my invention goes, it does not matter whether the reinforcements extend transversely across the building element, or longitudinally therethrough, or both, provided the reinforcing members project beyond the building element sufficiently to be bonded with the adjacent reinforcing elements to which they are to be connected.

My system of construction gives a perfect monolithic construction, more monolithic than is secured by the "molded-in-place" method, and particularly as where the structural elements are molded in place, there are often joints and seams caused by the stoppage of the work, wherever the work is stopped for any length of time, as well as where construction ceases in one place and is begun at another. By my system, I secure a joint of concrete with concrete which is more perfect than can be secured by the "molded-in-place" method, for the reason that more pains would be taken and the structural members and the joint could be better inspected. Furthermore, a richer mixture could be used. A structure made under my system is monolithic, for the reason that the concrete in a reinforced concrete structure is only subjected to compression strains, and it is as strong against this as if it were solid, the reinforcing rods of one structural element being connected to the reinforcing rods of the next adjacent element. By my system also the reinforcing rods can be put under tension, if so desired, and this cannot be done in the "molded-in-place" method. Furthermore, in my system, all the joints are in the most convenient position and do not occur accidentally as they do in the "molded-in-place" method above described. Means may also be provided for taking up expansion.

While as before stated I do not wish to be limited in any way to the reinforcement which I may use, or to the manner of reinforcing the concrete columns or beams I have shown as an illustration in Fig. 11 a concrete beam with a very effective system of reinforcing. This beam is to be used in the same manner, as the beams 5 and 15 shown in Fig. 3 and consists of a concrete body 116 through the lower portion of which below the neutral axis passes the longitudinal extending reinforcing members or rods 117, these are parallel to each other and project out at their ends beyond the body 116 and are hooked as at 118. Extending longitudinally through the beam parallel to the rods 117 are the parallel rods 119 which as they near the ends of the beam are upwardly bent as at 120 and then extend again parallel to the rods 117 and extend out through the ends of the beam and are formed with hooks 121. These rods or reinforcing members 117 and 119 may be of smooth or corrugated material as desired and they are preferably tied or bonded in the concrete body by means of continuous loops of wire 123, these are formed by connecting the end of a loop of wire to one of the rods 117 bringing the loop up over the rod 120 and then down again over the lower rod and so on backward and forward filling the space between the ends of the rods 120 and 117 where the rods 120 separate from the rods 117. This manner of reinforcing the beam is merely shown for detailed illustration, the previous figures of my construction showing these rods and reinforcing members diagrammatically.

Having thus described the invention, what I claim is.

1. In a concrete construction, a vertical column, said column being hollow and provided with reinforcing bars extending beyond the ends of the column, the interior face of the column being provided with an inwardly projecting shoulder, in combination with beams of concrete having reinforcing bars extending therethrough and projecting beyond the ends thereof, the projecting ends of said reinforcing members of abutting beams being tied together above the hollow interior of the column, a column superposed upon the abutting ends of adjoining beams and in alinement with the column below, and concrete filling disposed in the interior of both columns and joining the ends of the beams, said filling being supported on the shoulder formed in the column, and reinforcing members passing through said concrete filling.

2. In a concrete construction, a supporting beam recessed upon its upper face and its sides, subsidiary beams abutting on either side of the main supporting beam and in alinement with said recess, reinforcing members projecting out of the ends of the subsidiary beams and over the recessed portion of the main beam, means for interlocking the lower portion of the subsidiary beams with the main beam, and a filling of concrete filling the cut-away portion of the main beam and surrounding the reinforcing members of the subsidiary beams.

3. In concrete construction, a main beam recessed upon its upper face, beam hangers supported upon said main beam adjacent to said recess, and bolted to the same, subsidiary beams of concrete supported with their ends in said hangers, on either side of the main beam, reinforcing members located in said subsidiary beams, projecting into the cut-away portion in the upper face of the main beam, said reinforcing member of one subsidiary beam being tied to the reinforcing member of the opposed subsidiary beam, transverse bolts passing through the beam hangers and through the subsidiary beams, and a filling of cement filling the space between the subsidiary beams and the main beam and inclosing said reinforcing members.

In testimony whereof I affix my signature in presence of two witnesses.

ROBERT T. PEIRCE. [L. S.]

Witnesses:
 ELBERT NEXSEN,
 JAS. A. WHITE.